Aug. 22, 1933.     P. T. ROBIN     1,923,397
VEHICLE
Filed Dec. 6, 1929

Philip T. Robin
INVENTOR.

BY
ATTORNEYS.

Patented Aug. 22, 1933

1,923,397

UNITED STATES PATENT OFFICE 1,923,397

VEHICLE

Philip T. Robin, Erie, Pa., assignor, by mesne assignments, to The Wellman Engineering Company, Cleveland, Ohio, a Corporation of Ohio Application December 6, 1929. Serial No. 412,111

5 Claims. (Cl. 280—81)

The invention is particularly directed to the improvement of wheel truck constructions as they are used for vehicles carrying heavy loads, such as trailers, and the invention is illustrated in connection with a trailer. Such devices are usually supplied with a pair of wheels in alinement and in order that every wheel may carry its proper proportion of the load these wheels are connected with the frame through flexible supports. The present invention is directed to this connection and the trucks involved in such connection. Features and details of the invention will appear more fully from the specification and claims.

A preferred embodiment of the invention is illustrated in the accompanying drawing as follows:—

Figure 1:
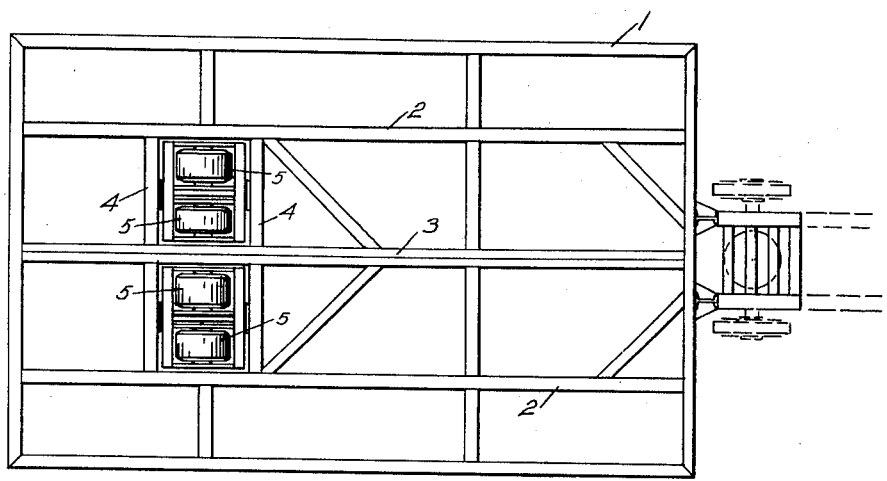

Fig. 1 shows a plan view of a trailer frame having the truck supports.

Figures 2, 4, 5:
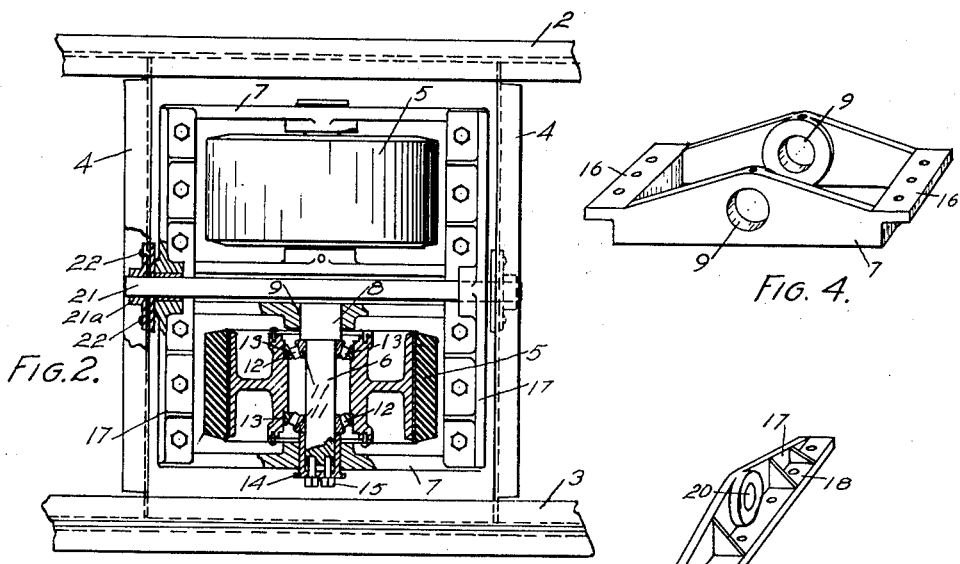

Fig. 2 an enlarged view of one of the trucks showing its frame connection.

Figure 3:
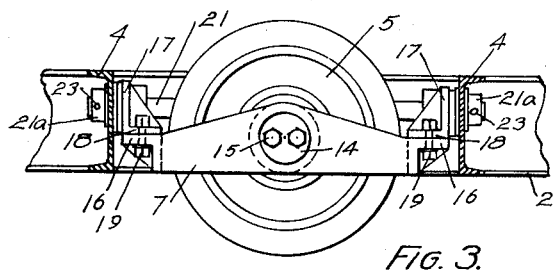

Fig. 3 a side elevation of the truck.

Fig. 4 a perspective view of a box frame for one of the wheels.

Fig. 5 a perspective view of the cross beam connecting box frame.

1 marks the trailer frame. This frame has the longitudinal members 2—2 and a central longitudinal member 3. The longitudinal members 2 and 3 are connected by cross members 4. Wheels 5 are carried on axles 6. The axles 6 are mounted in box frames 7. The axles have the enlarged ends 8 which extend through an opening 9 in the side bars of the box frame and form shoulders 10 which engage and locate the inner race-ways 11 of the roller bearing, the rollers 12 operating on an outer race-way 13. The opposite end of the axle is provided with a cap 14, the inner end of the cap forming a shoulder locating the inner race-way 11 of the outer roller bearing. This cap is secured on the end of the axle by means of screws 15.

The box frame 7 has a flange 16 and cross beams 17 are provided with flanges 18 adapted to seat on the flanges 16. Bolts 19 extending through the flanges 16 and 18 secure the cross beams to the adjacent box frames, combining two box frames into a rigid structure carrying the two wheels. The cross beams have journal openings 20 through which the swivel pin 21ª extends. This pin extends through caps 21 which are secured by bolts, or rivets 22 on the members 4. The pin 21ª is preferably locked with the caps by pins 23.

This makes a very rigid structure of truck, and one that may be readily fabricated in that the box members may be of cast metal, and at the same time gives a support at each end of the axle and makes it possible to conveniently and readily service the connection as a whole. Ordinarily there is a pair of trucks arranged in alinement and through the swivelled connection for the wheels all the wheel bottoms take up irregularities of the road.

What I claim as new is:—

1. In a vehicle, the combination of a vehicle frame; a truck comprising a pair of wheels side by side, axle bars at both sides of each wheel, axles for the wheels on which the bars are mounted, cross beams at the ends of the bars rigidly connecting the bar supported by one axle with the bar supported by the other axle; and a swivelled connection having its axis extending fore and aft between the cross beams and the frame.

2. In a vehicle, the combination of a vehicle frame; a truck comprising a pair of wheels side by side, a box frame for each wheel, an axle for each wheel, each axle supporting a box frame, and cross beams connecting the ends of the box frames whereby said frames are rigidly connected; and a swivelled connection having its axis extending fore and aft between the beams and the truck frame.

3. In a vehicle, the combination of a vehicle frame; a truck comprising a pair of wheels side by side, a box frame for each wheel, an axle for each wheel, each wheel being journaled on the axle and each axle supporting a box frame, and cross beams connecting the ends of the box frames whereby said frames are rigidly connected; and a swivelled connection having its axis extending fore and aft between the beams and the truck frame.

4. In a vehicle, the combination of a vehicle frame; a truck comprising a pair of wheels side by side, an integral box frame for each wheel, an axle for each wheel, each axle supporting a box frame, and cross beams connecting the ends of the box frames; and a swivelled connection having its axis extending fore and aft between the beams and the truck frame.

5. In a vehicle, the combination of a vehicle frame; a truck comprising a pair of wheels side by side, a box frame for each wheel, an axle for each wheel, each axle supporting a box frame, and cross beams connecting the ends of the box frames whereby said frames are rigidly connected; and a swivelled connection having its axis extending fore and aft between the beams and the truck frame comprising a pin fixed on the frame and on which the beams are journaled.

PHILIP T. ROBIN.